UNITED STATES PATENT OFFICE.

CHARLES DE LA HARPE AND CHARLES VAUCHER, OF BASLE, SWITZERLAND, ASSIGNORS TO L. DURAND, HUGUENIN & CIE., OF SAME PLACE, ST. FONS, FRANCE, AND HÜNINGEN, GERMANY.

GALLOCYANIN-LEUCO DERIVATIVE AND PROCESS OF MAKING SAME.

SPECIFICATION forming part of Letters Patent No. 629,666, dated July 25, 1899.

Application filed February 28, 1899. Serial No. 707,208. (Specimens.)

*To all whom it may concern:*

Be it known that we, CHARLES DE LA HARPE and CHARLES VAUCHER, chemists, citizens of the Swiss Republic, and residents of Basle, Switzerland, have invented a new and useful Gallocyanin-Leuco Derivative, of which the following is a clear, full, and exact specification.

The leuco derivative obtained by chemical reduction of the gallocyanins presents certain practical advantages over the original gallocyanin. Thus it is possible to obtain with the new leuco derivative on the fiber, particularly in printing, much stronger and bluer tints than with the original gallocyanin. The leuco derivative is more readily soluble in water than the gallocyanin from which it derives.

The hydrochloride of the leuco derivative forms a greenish body, which dissolves readily in water. This solution when an alkali is added thereto oxidizes itself by contact with air. The new leuco derivative is soluble in concentrated sulfuric acid, with a pale wine-red dichroic color. By the addition of a small quantity of an oxidizing agent the color of this solution in sulfuric acid turns to intense blue. The leuco derivative is plainly distinguished from that obtained by the action of the free or combined sulfurous acid upon the gallocyanins by the fact that it does not contain any sulfur.

This leuco-gallocyanin is readily obtained by the usual methods of chemical reduction—as, for example, with zinc, tin, stannous chloride, aluminium, sodium stannite, glucose and soda-lye, the sulfides of the alkali metals, &c. It is therefore unnecessary to give an example for each of the possible reducing agents, and we will limit ourselves to two examples that involve somewhat different methods of operation.

Example I: Thirty-three kilos of gallamine blue (gallocyanin obtained by the reaction of nitrosodimethylaniline hydrochloride upon gallamic acid) or an equivalent quantity of another gallocyanin are suspended in six hundred liters of lukewarm water. Twelve kilos hydrochloric acid are added, and then gradually, while strongly stirring, twenty kilos of zinc-dust or an equivalent quantity of another reducing agent operating in acid solution. When the reduction is about completed, a further twenty kilos of hydrochloric acid are added (when using tin all the acid must be added in the first instance) and the mass is heated to 80° to 90° centigrade and then filtered. From the filtered and cooled liquid the leuco derivative can be salted out. For purifying this it is again dissolved in warm water, acidified with hydrochloric acid, and after cooling the leuco derivative is again salted out. This leuco-gallocyanin forms a greenish mass, which is formed into a paste with water, or it can be dried. It is soluble in water with a brownish-green color, and in concentrated sulfuric acid with a dichroic claret-red color. By the addition of small quantities of oxidizing agents the color of this solution in sulfuric acid passes over to intense blue.

Example II: There are introduced consecutively into a closed vessel four hundred liters warm water, thirty-six kilos gallocyanin obtained by the reaction of nitrosodiethylaniline hydrochloride, or diethylamido-azo-benzene hydrochloride upon gallamic acid, or an equivalent quantity of another gallocyanin, and afterward there are added eighty-six kilos of a ten-per-cent. solution of sodium sulfide (or an equivalent quantity of another reducing agent acting in alkaline solution) which has previously been mixed with a solution containing from twenty-four to thirty per cent. of caustic soda, and a current of steam is introduced into the apparatus while stirring for heating the mass and driving the air out of the apparatus. When solution is complete and the solution shows a dead-brown coloration, the liquid is poured into another receptacle containing sixty-six kilos of hydrochloric acid diluted in one hundred liters of warm water, the vessel being connected with a chimney-flue. The mass is strongly stirred, filtered, and the leuco derivative is salted out.

The faculty of the leuco-gallocyanin of being oxidized into a coloring-matter depends on the quantity of free mineral acid which is mixed thereto. The oxidation of the leucogallocyanin takes place the more rapidly the smaller is the quantity of free mineral acid contained therein, and is also effectuated more rapidly in diluted than in concentrated solutions, probably because in dilute solutions a dissociation of its hydrochloride takes place.

What we claim is—

1. A process for the production of a leucogallocyanin, which consists in treating a gallocyanin, in a suitable medium, with a reducing agent, substantially as set forth.

2. As a new article of manufacture, the herein-described leuco-gallocyanin, which contains no sulfur, is more ready soluble in water, and gives in printing more intense and bluer tints than the original gallocyanin and dissolves in concentrated sulfuric acid with a pale, wine-red, dichroic color, which turns to intense blue by addition of a small quantity of an oxidizing agent, substantially as set forth.

In witness whereof we have hereunto signed our names, this 14th day of February, 1899, in the presence of two subscribing witnesses.

CHARLES DE LA HARPE.
CHARLES VAUCHER.

Witnesses:
GEORGE GIFFORD,
AMAND RITTER.